US009245546B1

(12) United States Patent
Keshavan et al.

(10) Patent No.: US 9,245,546 B1
(45) Date of Patent: Jan. 26, 2016

(54) CONTAMINATION MITIGATION CAP FOR A HARD DISK DRIVE ACTUATOR PIVOT ASSEMBLY

(71) Applicant: HGST Netherlands B.V., Amsterdam (NL)

(72) Inventors: Manoj B. Keshavan, San Jose, CA (US); Jung-Seo Park, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/642,450

(22) Filed: Mar. 9, 2015

(51) Int. Cl.
*G11B 5/39* (2006.01)

(52) U.S. Cl.
CPC ........................................ *G11B 5/39* (2013.01)

(58) Field of Classification Search
CPC .. G11B 5/4813; G11B 5/5521; G11B 25/043; G11B 5/5569; G11B 33/08
USPC ............................................ 360/265.2, 234.4
See application file for complete search history.

(56) References Cited

U.S. PATENT DOCUMENTS

| | | | |
|---|---|---|---|
| 6,280,094 B1 | 8/2001 | Gilliland et al. | |
| 6,599,020 B2 | 7/2003 | Obara | |
| 6,631,053 B1 * | 10/2003 | Chew | 360/265.6 |
| 7,072,148 B2 | 7/2006 | Tsuchiya | |
| 7,341,379 B2 | 3/2008 | Koyama | |
| 8,363,358 B2 * | 1/2013 | Liu et al. | 360/265.2 |
| 8,547,664 B1 * | 10/2013 | Foisy et al. | 360/265.2 |
| 8,553,366 B1 * | 10/2013 | Hanke | 360/264.2 |
| 8,995,093 B2 * | 3/2015 | Nanasawa et al. | 360/265.3 |
| 2013/0301160 A1 | 11/2013 | Nanasawa et al. | |

OTHER PUBLICATIONS

Labyrinth Seal for Pivot of a Spindle Motor, ip.com prior art database, Jul. 1, 1995, 3 pages, ip.com disclosure No. IPCOM000116027D, IP.COM I, LLC.

* cited by examiner

*Primary Examiner* — Mark Blouin
(74) *Attorney, Agent, or Firm* — John D. Henkhaus (57) ABSTRACT

A contamination mitigation cap for a hard disk drive actuator pivot assembly is affixed to the rotatable carriage of an actuator assembly and, in conjunction with a bearing hub cap, forms a labyrinth seal for retaining pivot bearing contamination. Consequently, the risk of such contamination migrating to the head-disk interface and causing read/write problems is mitigated, especially in the context of sleeveless pivot bearing assemblies. Various shapes of the contamination mitigation cap may be utilized, such as a flat ring, an S-section ring, and an L-section ring.

20 Claims, 6 Drawing Sheets

CONTAMINATION MITIGATION CAP FOR A HARD DISK DRIVE ACTUATOR PIVOT ASSEMBLY

FIELD OF EMBODIMENTS

Embodiments of the invention may relate generally to hard disk drives and more particularly to a contamination mitigation cap for an actuator pivot assembly.

BACKGROUND

A hard-disk drive (HDD) is a non-volatile storage device that is housed in a protective enclosure and stores digitally encoded data on one or more circular disk having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Because the actuator rotates to move across portions of the disk, the actuator includes a pivot assembly. The pivot assembly typically includes a pivot bearing assembly, such as a ball-bearing assembly. Because moving parts are involved, the pivot bearing assembly typically includes a lubricant, such as a hydrocarbon-based oil. Such a bearing assembly is typically not completely sealed and, therefore, some of the lubricant is known to exit the bearing assembly and can migrate to the head-disk interface (HDI) which can lead to read and/or write errors. Thus, minimizing the risk of contaminants from the pivot bearing reaching the HDI and causing operational errors is an ongoing challenge associated with hard disk drive design and development efforts.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward an actuator contamination mitigation cap, a hard disk drive and corresponding actuator pivot assembly employing such a contamination mitigation cap, and a method for assembling an actuator pivot assembly utilizing such a contamination mitigation cap, where the contamination mitigation cap is affixed to the rotatable carriage of the actuator assembly and, in conjunction with a bearing hub cap, forms a labyrinth seal for retaining pivot bearing contamination. Consequently, the risk of such contamination migrating to the head-disk interface and causing read and/or write problems is mitigated.

Embodiments include various shapes of the contamination mitigation cap, such as a flat ring, an S-section ring, and an L-section ring. Additionally, the contamination mitigation cap may include a constituent pressure sensitive adhesive for bonding the cap to the carriage. For a non-limiting example, an actuator pivot assembly in which the type of contamination mitigation cap described herein is utilized is especially useful in the context of sleeveless pivot bearing assemblies.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to an actuator contamination mitigation cap are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Operating Environments

Embodiments may be used for mitigating contamination from an actuator in a hard disk drive (HDD) storage device. Thus, in accordance with an embodiment, a plan view illustrating an HDD 100 is shown in FIG. 1 to illustrate an exemplary operating environment.

Figure 1:
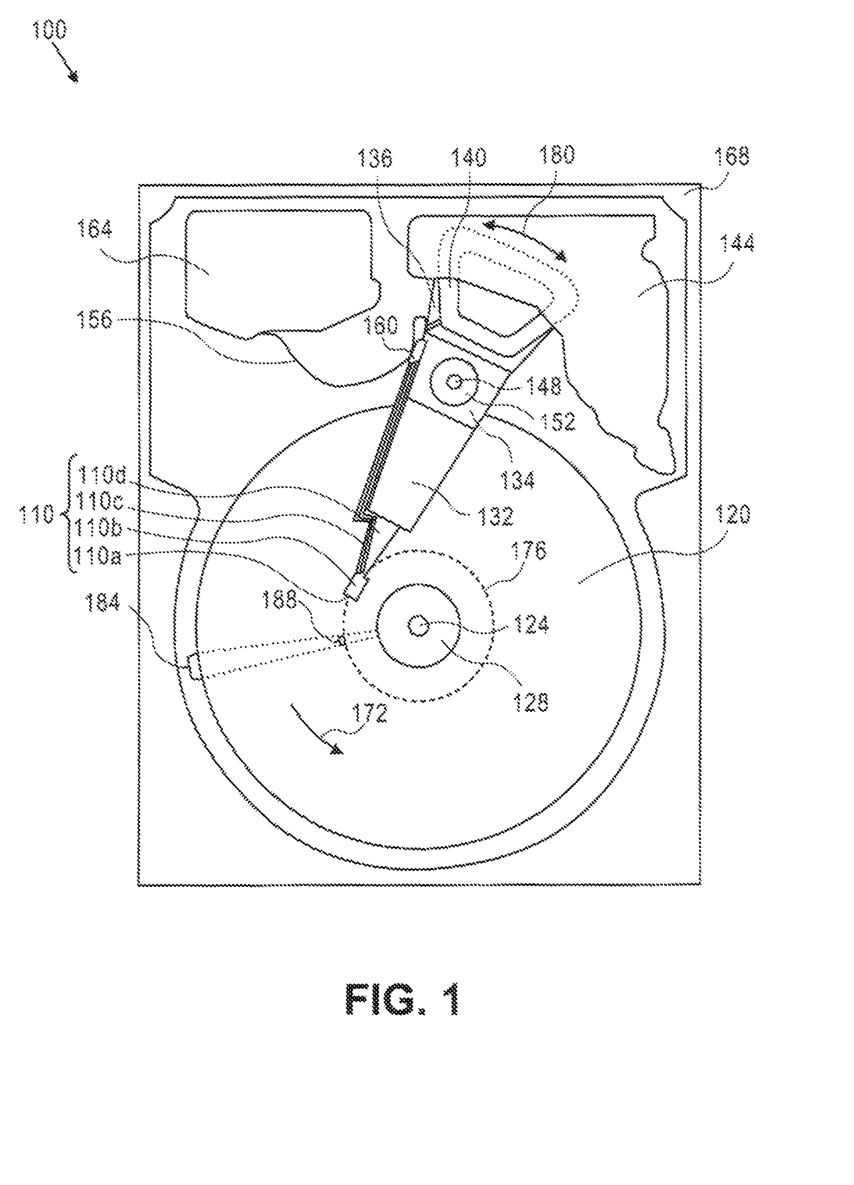
FIG. 1 is a plan view illustrating a hard disk drive (HDD), according to an embodiment.

FIG. 1 illustrates the functional arrangement of components of the HDD 100 including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one magnetic-recording medium 120 rotatably mounted on a spindle 124 and a drive motor (not visible) attached to the spindle 124 for rotating the medium 120. The head 110a includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110, to access portions of the medium 120, being mounted on a pivot-shaft 148 with an interposed pivot bearing assembly 152. In the case of an HDD having multiple disks, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a base, in conjunction with an HDD cover provides a sealed, protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector"), for example, sectored track portion 188. Each sectored track portion 188 may be composed of recorded data and a header containing a servo-burst-signal pattern, for example, an ABCD-servo-burst-signal pattern, which is information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

As mentioned, the pivot bearing assembly typically includes a lubricant and because such a bearing assembly is typically not completely sealed, some of the lubricant is known to exit the bearing assembly and can migrate to the head-disk interface (HDI) which can lead to read and/or write errors. Thus, minimizing the risk of contaminants from the pivot bearing reaching the HDI and causing operational errors is an ongoing challenge associated with hard disk drive design and development efforts. Such challenges are especially pertinent with hard disk drives for enterprise applications, which have more stringent requirements for drive reliability.

One possible approach to minimizing the risk of hydrocarbons migrating from the pivot bearing to the HDI involves applying barrier films at critical locations along the migration path, which act as anti-wetting agents and inhibit the transport of lubricants. However, there can be significant tooling capital and process costs, and increased complexity, associated with such an approach. Furthermore, a containment approach may also be viable, i.e., by containing the lubricant at the pivot bearing assembly.

Figure 2:
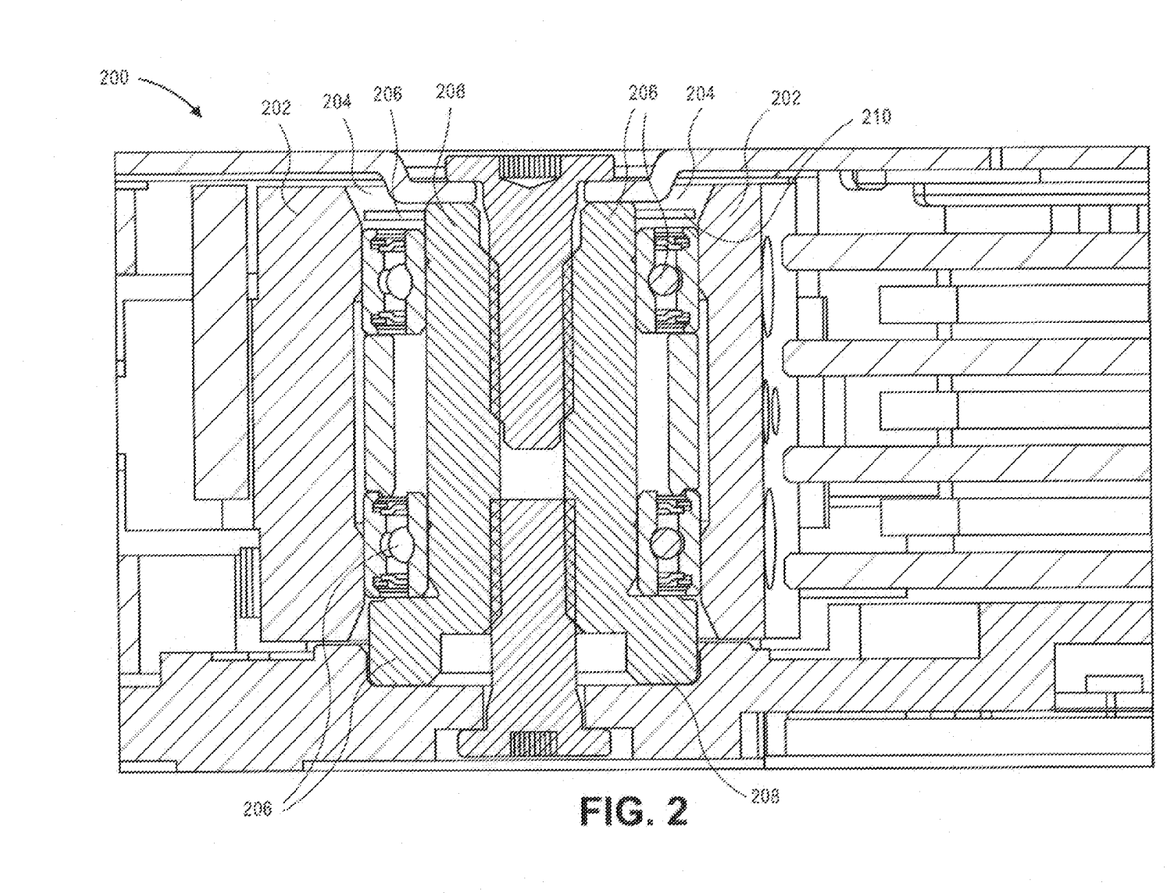
FIG. 2 is a cross-sectional side view illustrating an HDD actuator pivot assembly, according to an embodiment.

FIG. 2 is a cross-sectional side view illustrating an HDD actuator pivot assembly, according to an embodiment. Actuator pivot assembly 200 comprises an actuator comb comprising a carriage 202 having a bore 204 therethrough. Actuator pivot assembly 200 further comprises a sleeveless pivot bearing assembly 206 disposed within the carriage bore 204 and a shaft 208 to which a circular ring-shaped hub cap 210 is attached. The hub cap 210 provides some degree of resistance to the outflow of lubricant (e.g., oil) from the pivot bearing. However, because the pivot bearing assembly 206 is a sleeveless assembly (at least in part due to space constraints and optimizations within an HDD), any approach involving the creation of a labyrinth seal in association with the hub cap 210 and such a bearing sleeve is not achievable.

Actuator Pivot Assembly Having a Contamination Mitigation Cap

Figure 3A:
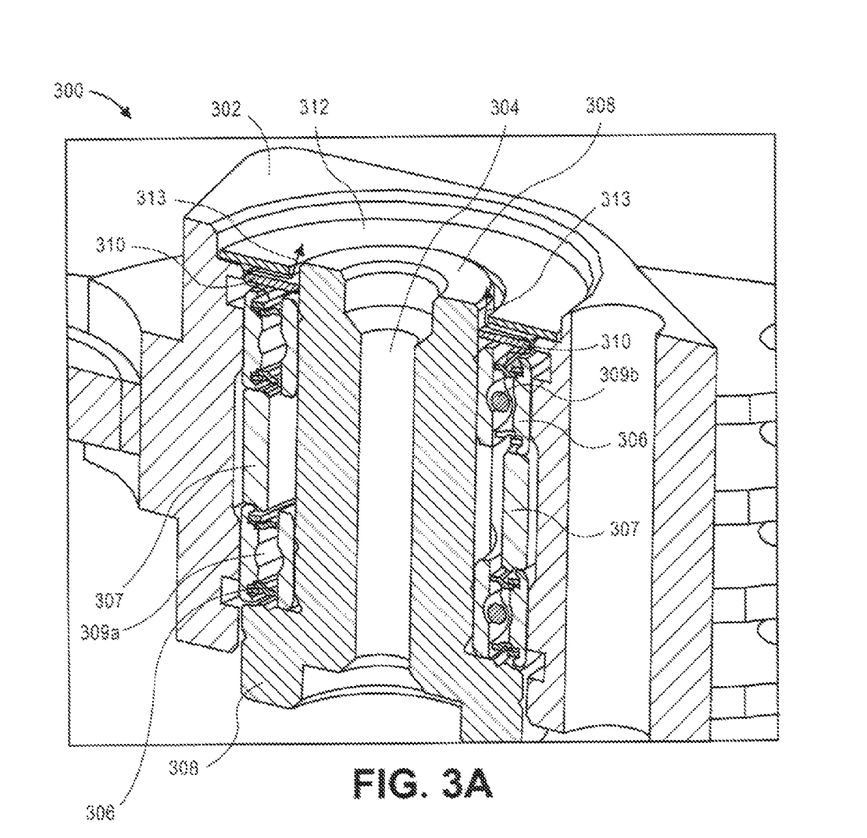
FIG. 3A is a cross-sectional side view illustrating an HDD actuator pivot assembly, according to an embodiment.

FIG. 3A is a cross-sectional side view illustrating an HDD actuator pivot assembly, according to an embodiment. Actuator pivot assembly 300 comprises a rotatable actuator comb comprising a carriage 302 having a bore 304 therethrough. Actuator pivot assembly 300 further comprises a pivot bearing assembly 306 (e.g., sleeveless) disposed within the carriage bore 304 and a shaft 308 to which a circular ring-shaped lower hub cap 310 is fixed. A typical pivot bearing assembly is composed of the shaft 308, a spacer 307, lower bearing 309a and upper bearing 309B, and the lower hub cap 310.

Additionally, the actuator pivot assembly 300 comprises a contamination mitigation cap 312 bonded to the rotatable carriage 302. The contamination mitigation cap 312 is configured, in positional relation with the lower hub cap 310, to form a labyrinth for retaining contamination (e.g., lubricant, oil) from the pivot bearing assembly 306. Thus, bearing oil would have to travel along a circuitous labyrinth 313 path in order to outflow from the actuator pivot assembly 300 and, therefore, is now less likely to be able to migrate over time and operational use, to the head-disk interface where it could otherwise cause significant operational problems. According to an embodiment, the contamination mitigation cap 312 is positioned above the lower hub cap 310, to form the labyrinth.

Notably, the contamination mitigation cap 312 is bonded to the carriage 302 rather than to any part of the pivot bearing 306, such as to a pivot bearing sleeve which is not present in the design of a sleeveless bearing such as pivot bearing assembly 306. Use of a sleeveless pivot bearing can be beneficial in an HDD design as it consumes less internal space and provides for reduced cost and reduced inertia, which may lead to better actuator performance and thus better HDD performance than an HDD design in which a sleeved bearing is used. However, according to an embodiment, the pivot bearing assembly used in an actuator pivot assembly according to embodiments described herein may be a pivot bearing assembly comprising an outer sleeve, i.e., a sleeved pivot bearing assembly.

Figure 3B:
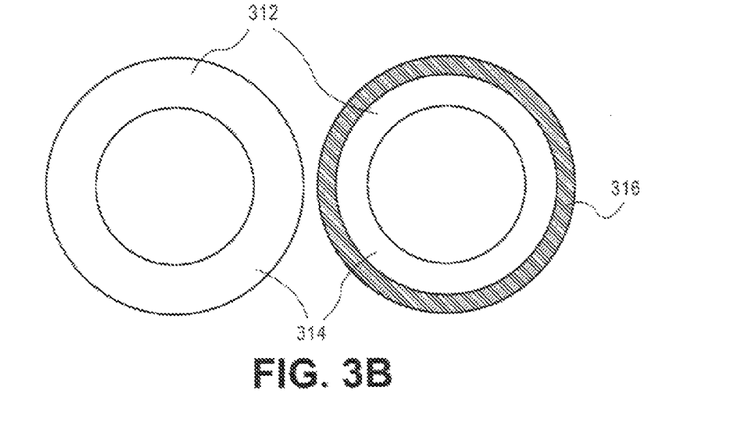
FIG. 3B is a perspective view illustrating a contamination mitigation cap, according to an embodiment.

FIG. 3B is a perspective view illustrating a contamination mitigation cap 312, according to an embodiment. Contamination mitigation cap 312 is composed of a flat metal ring portion 314, and a pressure sensitive adhesive (PSA) 316 around the outer edge of the contamination mitigation cap 312 for bonding the contamination mitigation cap 312 to a portion, i.e., a seat, of the carriage 302. Use of a PSA may be beneficial in providing for removal of the contamination mitigation cap 312, for example, for reworking a unit. Further, use of a PSA does not require curing and cleaning, such as with some other bonding adhesives.

According to an embodiment, the metal of flat metal ring portion 314 is a stainless steel material. One approach to the formation of the contamination mitigation cap 312 may be to stamp the metal to form the cap. However, the contamination mitigation cap 312 may be formed of a material other than metal, such as a synthetic or synthetic polymer material, for a non-limiting example, a plastic.

Figure 4A:
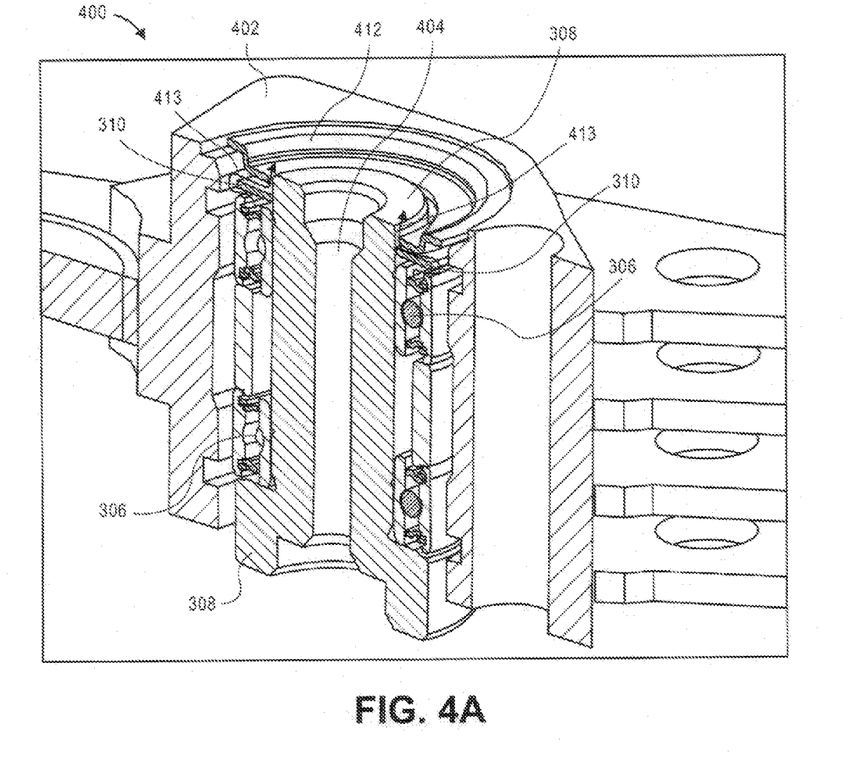
FIG. 4A is a cross-sectional side view illustrating an HDD actuator pivot assembly, according to an embodiment.

FIG. 4A is a cross-sectional side view illustrating an HDD actuator pivot assembly, according to an embodiment. Actuator pivot assembly 400 comprises a rotatable actuator comb comprising a carriage 402 having a bore 404 therethrough. Actuator pivot assembly 400 further comprises a pivot bearing assembly 306 (e.g., sleeveless) disposed within the carriage bore 404 and a shaft 308 to which a circular ring-shaped lower hub cap 310 is fixed.

Additionally, the actuator pivot assembly 400 comprises a contamination mitigation cap 412 bonded to the rotatable carriage 402. The contamination mitigation cap 412 is configured, in positional relation with the lower hub cap 310, to form a labyrinth for retaining contamination (e.g., lubricant, oil) from the pivot bearing assembly 306. Thus, bearing oil would have to travel along a circuitous labyrinth 413 path in order to outflow from the actuator pivot assembly 400 and, therefore, is now less likely to be able to migrate over time and operational use, to the head-disk interface where it could otherwise cause significant operational problems. According to an embodiment, the contamination mitigation cap 412 is positioned above the lower hub cap 310, to form the labyrinth. Notably, the contamination mitigation cap 412 is bonded to the carriage 402 rather than to any part of the pivot bearing 306, such as to a pivot bearing sleeve which is not present in the design of a sleeveless bearing such as pivot bearing assembly 306.

Figure 4B:
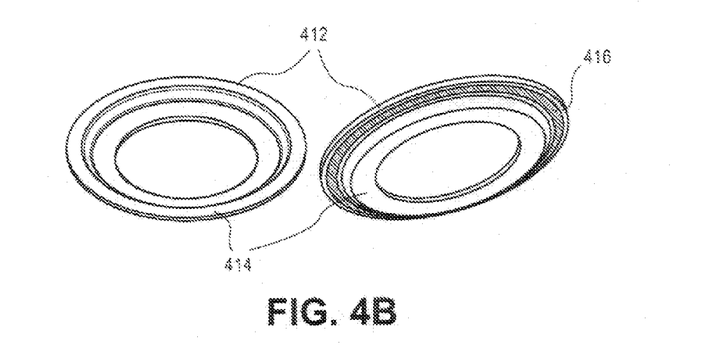
FIG. 4B is a perspective view illustrating a contamination mitigation cap, according to an embodiment.

FIG. 4B is a perspective view illustrating a contamination mitigation cap, according to an embodiment. Contamination mitigation cap 412 is composed of a S-section (i.e., the cross-sectional shape roughly resembles the letter "S", or perhaps the letter "Z") metal ring portion 314, substantially as depicted in FIGS. 4A and 4B, and a pressure sensitive adhesive (PSA) 416 around the upper outer edge of the contamination mitigation cap 412 for bonding the contamination mitigation cap 412 to a portion, i.e., a seat, of the carriage 402. Use of a PSA may be beneficial in providing for removal of the contamination mitigation cap 412, for example, for reworking a unit. Further, use of a PSA does not require curing and cleaning, such as with some other bonding adhesives.

According to an embodiment, the metal of the S-section metal ring portion 414 is a stainless steel material. One approach to the formation of the contamination mitigation cap 312 may be to stamp the metal to form the cap. However, the contamination mitigation cap 312 may be formed of a material other than metal, such as a synthetic or synthetic polymer material, for a non-limiting example, a plastic. The shape of the contamination mitigation cap 412 (FIGS. 4A, 4B) provides for a chamfer for swaging purposes. Contamination mitigation cap 412 (FIGS. 4A, 4B) has a more complex geometry and higher stiffness than the contamination mitigation cap 312 (FIGS. 3A, 3B), but is also likely a little bit more costly.

Figure 5A:
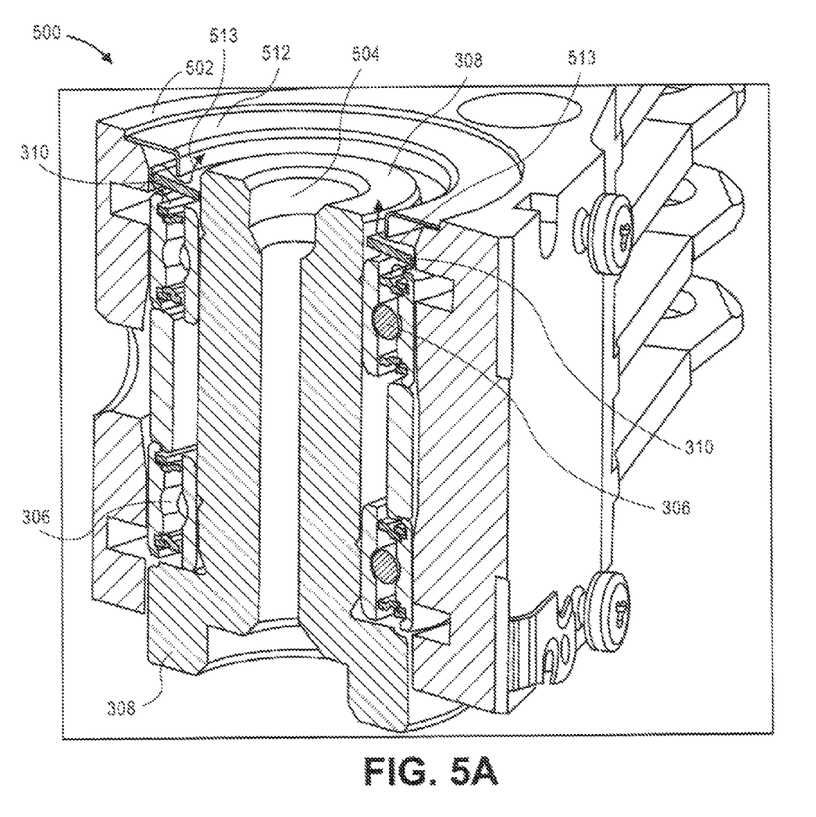
FIG. 5A is a cross-sectional side view illustrating an HDD actuator pivot assembly, according to an embodiment.

FIG. 5A is a cross-sectional side view illustrating an HDD actuator pivot assembly, according to an embodiment. Actuator pivot assembly 500 comprises a rotatable actuator comb comprising a carriage 502 having a bore 504 therethrough. Actuator pivot assembly 500 further comprises a pivot bearing assembly 306 (e.g., sleeveless) disposed within the carriage bore 504 and a shaft 308 to which a circular ring-shaped lower hub cap 310 is fixed.

Additionally, the actuator pivot assembly 500 comprises a contamination mitigation cap 512 bonded to the rotatable carriage 502. The contamination mitigation cap 512 is configured, in positional relation with the lower hub cap 310, to form a labyrinth for retaining contamination (e.g., lubricant, oil) from the pivot bearing assembly 306. Thus, bearing oil would have to travel along a circuitous labyrinth path 513 in order to outflow from the actuator pivot assembly 500 and, therefore, is now less likely to be able to migrate over time and operational use, to the head-disk interface where it could otherwise cause significant operational problems. According to an embodiment, the contamination mitigation cap 512 is positioned above the lower hub cap 310, to form the labyrinth. Notably, the contamination mitigation cap 512 is bonded to the carriage 502 rather than to any part of the pivot bearing 306, such as to a pivot bearing sleeve which is not present in the design of a sleeveless bearing such as pivot bearing assembly 306.

Figure 5B:
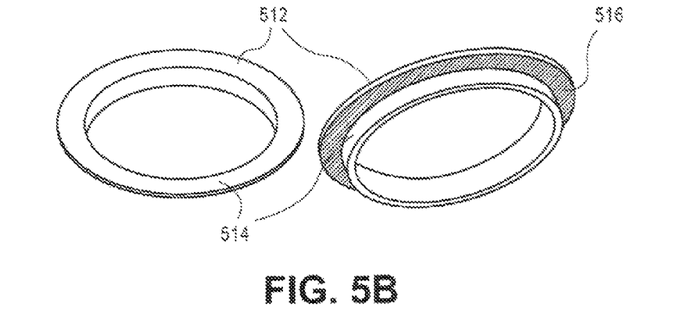
FIG. 5B is a perspective view illustrating a contamination mitigation cap, according to an embodiment.

FIG. 5B is a perspective view illustrating a contamination mitigation cap, according to an embodiment. Contamination mitigation cap 512 is composed of an L-section (i.e., the cross-sectional shape roughly resembles the letter "L") metal ring portion 514, substantially as depicted in FIGS. 5A and 5B, and a pressure sensitive adhesive (PSA) 516 around the upper outer edge of the contamination mitigation cap 512 for bonding the contamination mitigation cap 512 to a portion, i.e., a seat, of the carriage 502. Use of a PSA may be beneficial in providing for removal of the contamination mitigation cap 512, for example, for reworking a unit. Further, use of a PSA does not require curing and cleaning, such as with some other bonding adhesives.

According to an embodiment, the metal of the L-section metal ring portion 514 is a stainless steel material. One approach to the formation of the contamination mitigation cap 312 may be to stamp the metal to form the cap. However, the contamination mitigation cap 312 may be formed of a material other than metal, such as a synthetic or synthetic polymer material, for a non-limiting example, a plastic. The shape of the contamination mitigation cap 512 (FIGS. 5A, 5B) provides for a chamfer for swaging purposes, and has a more complex geometry and higher stiffness than the contamination mitigation cap 312 (FIGS. 3A, 3B), but is also likely a little bit more costly.

Method for Assembling a Hard Disk Drive Actuator Pivot Assembly

Figure 6:
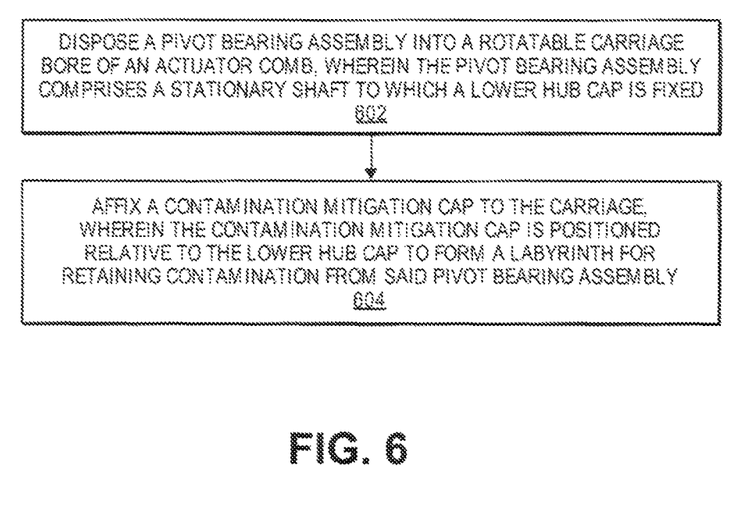
FIG. 6 is a flow diagram illustrating a method for assembling an HDD actuator pivot assembly, according to an embodiment.

FIG. 6 is a flow diagram illustrating a method for assembling an HDD actuator pivot assembly, according to an embodiment.

At block 602, dispose a pivot bearing assembly into a rotatable carriage bore of an actuator comb, wherein the pivot bearing assembly comprises a stationary shaft to which a lower hub cap is fixed.

For example, pivot bearing assembly 306 (FIGS. 3A, 4A, 5A) is disposed into carriage bore 304, 404, 504 (FIGS. 3A, 4A, 5A, respectively) of carriage 302, 402, 502 (FIGS. 3A, 4A, 5A, respectively), where the pivot bearing assembly 306 includes stationary shaft 308 to which a lower hub cap 310 (FIGS. 3A, 4A, 5A) is fixed. Pivot bearing assemblies such as pivot bearing assembly 306 may be press-fit into a carriage bore such as carriage bore 304, 404, 504 of carriage 302, 402, 502. While pivot bearing assembly 306 is depicted as, and according to an embodiment is, a sleeveless bearing assembly, the method of FIG. 6 could also apply to the use of a sleeved pivot bearing assembly.

At block 604, a contamination mitigation cap is affixed to the carriage, wherein the contamination mitigation cap is positioned relative to the lower hub cap to form a labyrinth, for retaining contamination from the pivot bearing assembly.

For example, contamination mitigation cap 312, 412, 512 (FIGS. 3A, 4A, 5A, respectively) is bonded or press-fit, for non-limiting example, to the carriage 302, 402, 502 (FIGS. 3A, 4A, 5A, respectively), where the contamination mitigation cap 312, 412, 512 is positioned relative to lower hub cap 310 (FIGS. 3A, 4A, 5A) to form a labyrinth 313, 413, 513 (FIGS. 3A, 4A, 5A, respectively) path to mitigate the outflow and migration of contaminants from the pivot bearing assembly 306 (FIGS. 3A, 4A, 5A).

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive actuator pivot assembly comprising:
   a rotatable actuator comb comprising a carriage having a bore therethrough;
   a pivot bearing assembly disposed in said carriage bore and comprising a stationary shaft to which a lower cap is fixed; and
   a contamination mitigation cap bonded to said rotatable carriage and configured, in positional relation with said lower cap, to form a labyrinth for retaining contamination.

2. The actuator pivot assembly of claim 1, wherein said contamination mitigation cap is positioned above said lower cap.

3. The actuator pivot assembly of claim 1, wherein said contamination mitigation cap comprises a flat metal ring and a pressure sensitive adhesive.

4. The actuator pivot assembly of claim 1, wherein said contamination mitigation cap comprises an S-section metal ring and a pressure sensitive adhesive.

5. The actuator pivot assembly of claim 1, wherein said contamination mitigation cap comprises an L-section metal ring and a pressure sensitive adhesive.

6. The actuator pivot assembly of claim 1, wherein said pivot bearing assembly is a sleeveless pivot bearing assembly lacking an outer sleeve.

7. A hard disk drive (HDD) comprising:
   one or more recording disk media rotatably mounted on a spindle;
   a head slider comprising a read/write head configured to read from and to write to said one or more disk media;
   a voice coil actuator configured to move said head slider to access portions of said one or more disk media, said actuator comprising a pivot assembly comprising:
      a rotatable actuator comb comprising a carriage having a bore therethrough,
      a pivot bearing assembly disposed in said carriage bore and comprising a stationary shaft to which a lower cap is fixed, and
      a contamination mitigation cap bonded to said rotatable carriage and configured, in positional relation with said lower cap, to form a labyrinth for retaining contamination.

8. The hard disk drive of claim 7, wherein said contamination mitigation cap is positioned above said lower cap.

9. The hard disk drive of claim 7, wherein said contamination mitigation cap comprises a flat metal ring and a pressure sensitive adhesive.

10. The hard disk drive of claim 7, wherein said contamination mitigation cap comprises an S-section metal ring and a pressure sensitive adhesive.

11. The hard disk drive of claim 7, wherein said contamination mitigation cap comprises an L-section metal ring and a pressure sensitive adhesive.

12. The hard disk drive of claim 7, wherein said pivot bearing assembly is a sleeveless pivot bearing assembly lacking an outer sleeve.

13. A method for assembling a hard disk drive actuator pivot assembly, the method comprising:
   disposing a pivot bearing assembly into a rotatable carriage bore of an actuator comb, wherein said pivot bearing assembly comprises a stationary shaft to which a lower cap is fixed; and
   affixing a contamination mitigation cap to said carriage, wherein said contamination mitigation cap is positioned relative to said lower cap to form a labyrinth for retaining contamination from said pivot bearing assembly.

14. The method of claim 13, wherein affixing includes affixing said contamination mitigation cap in a position above said lower cap.

15. The method of claim 13, wherein said contamination mitigation cap comprises a flat metal ring and a pressure sensitive adhesive.

16. The method of claim 13, wherein said contamination mitigation cap comprises an S-section metal ring and a pressure sensitive adhesive.

17. The method of claim 13, wherein said contamination mitigation cap comprises an L-section metal ring and a pressure sensitive adhesive.

18. The method of claim 13, wherein affixing includes bonding said contamination mitigation cap to said carriage.

19. The method of claim 13, wherein affixing includes press-fitting said contamination mitigation cap to said carriage.

20. The method of claim 13, wherein said pivot bearing assembly lacks an outer sleeve.

* * * * *